(12) United States Patent
Markyvech

(10) Patent No.: US 8,064,178 B2
(45) Date of Patent: Nov. 22, 2011

(54) METHOD AND APPARATUS FOR BALANCING CURRENT THROUGH AN INTERRUPT DEVICE

(75) Inventor: Craig R. Markyvech, Romulus, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 703 days.

(21) Appl. No.: 12/147,322

(22) Filed: Jun. 26, 2008

(65) Prior Publication Data

US 2009/0323239 A1    Dec. 31, 2009

(51) Int. Cl.
*H01H 9/00* (2006.01)
(52) U.S. Cl. ............................................. 361/57; 361/42
(58) Field of Classification Search .................. 361/57
See application file for complete search history.

(56) References Cited

U.S. PATENT DOCUMENTS

| | | | | |
|---|---|---|---|---|
| 4,197,567 | A * | 4/1980 | Dietz et al. | 361/45 |
| 7,834,636 | B2 * | 11/2010 | Lewinski et al. | 324/509 |
| 2004/0080879 | A1 * | 4/2004 | Radosavljevic et al. | 361/42 |
| 2005/0073780 | A1 * | 4/2005 | Elms et al. | 361/42 |

* cited by examiner

*Primary Examiner* — Stephen W Jackson
*Assistant Examiner* — Angela Brooks
(74) *Attorney, Agent, or Firm* — Ingrassia Fisher & Lorenz P.C.

(57) ABSTRACT

Systems and methods are provided for balancing current through a first conductor and a second conductor. A method comprises determining if a first current through the first conductor is greater than a second current through the second conductor by more than a threshold value. The first current and the second current are received from a ground fault current interrupt device. The method further comprises increasing the second current in response to determining that the first current is greater than the second current by more than the threshold value.

20 Claims, 3 Drawing Sheets

METHOD AND APPARATUS FOR BALANCING CURRENT THROUGH AN INTERRUPT DEVICE

TECHNICAL FIELD

Embodiments of the subject matter described herein relate generally to electrical charging systems, and more particularly, embodiments of the subject matter relate to current balancing systems for charge current interrupt devices used in vehicle charging systems.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid and electric vehicles.

Electric or hybrid vehicles often utilize electric motors as an alternative to internal combustion engines or other fuel-based engines. These electric motors generally operate on electricity from an energy storage device within the vehicle (e.g., a battery pack or an ultracapacitor). Rechargeable or plug-in vehicles allow these energy storage devices to be charged from an external power source when the vehicle is not in operation. For example, a vehicle may be plugged into or otherwise connected to a residential wall outlet to provide power from the main power supply for the residence to a charging circuit within the vehicle.

Often, a charging cord is used to connect the vehicle to an external power supply. These charging cords generally include a safety device or interrupt device, such as a charge current interrupt device (CCID), which disconnects the charging circuit whenever the device detects a current imbalance (or current leakage) between the conductors in the cord that exceeds a trip point. The trip point or level of imbalance is generally set at a high-enough level that avoids undesirable or nuisance trips as a result of exposure to environmental conditions (e.g., the cord is outside in the rain) during otherwise normal operating conditions (e.g., fault-free), yet low-enough that it provides adequate protection against fault conditions.

However, most residential power systems are equipped with a ground fault current interrupter (GFCI) or other residual current device designed with a significantly lower trip point than the safety device on the vehicle charging cord. In this situation, the device with the lower trip setting (i.e., the GFCI) will always trip before the safety device on the vehicle charging cord. This defeats the purpose of the safety device on the charging cord, and may result in undesirable nuisance trips during routine operations. Often, when the GFCI device trips, the user must manually reset the device which may result in an incomplete vehicle battery charge. In some cases, the GFCI device may be difficult to locate or access, placing additional burdens on the user.

BRIEF SUMMARY

An apparatus is provided for a charge current interruption device. The charge current interrupt device comprises a current sensor adapted to be coupled to a first conductor and a second conductor. The current sensor is configured to obtain a first current through the first conductor and a second current through the second conductor. A first switched load comprising a first load element is coupled between the first conductor and a reference potential. A switching control is coupled to the current sensor and the first switched load. The switching control is configured to activate the first switched load, such that the first load element is coupled between the first conductor and the reference potential, if the second current is greater than the first current by more than a threshold value.

A method is provided for balancing current through a first conductor and a second conductor. The method comprises determining if a first current through the first conductor is greater than a second current through the second conductor by more than a threshold value. The first conductor and the second conductor are coupled to a ground fault current interrupt device, and the first current and the second current are received from the ground fault current interrupt device. The method further comprises increasing the second current in response to determining that the first current is greater than the second current by more than the threshold value.

An apparatus is provided for a charge current interrupt device. The charge current interrupt device comprises a first means for measuring current through a plurality of conductors coupled to the charge current interruption device. The charge current interrupt device further comprises a second means for increasing a first current through a first conductor of the plurality of conductors if the first current is less than a second current though a second conductor of the plurality of conductors by more than a threshold value.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown depict one exemplary arrangement of elements, additional intervening elements, devices, features, or components may be present in a practical embodiment of the depicted subject matter.

For the sake of brevity, conventional techniques related to current sensing, processing, signaling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts described herein relate generally to charging systems for electric and hybrid-electric vehicles. Systems and methods are provided for balancing the current at an external interrupt device to allow a charge current interrupt device on the cord used to charge the vehicle to trip at a higher trip point than the external interrupt device allows absent current balancing.

Figure 1:
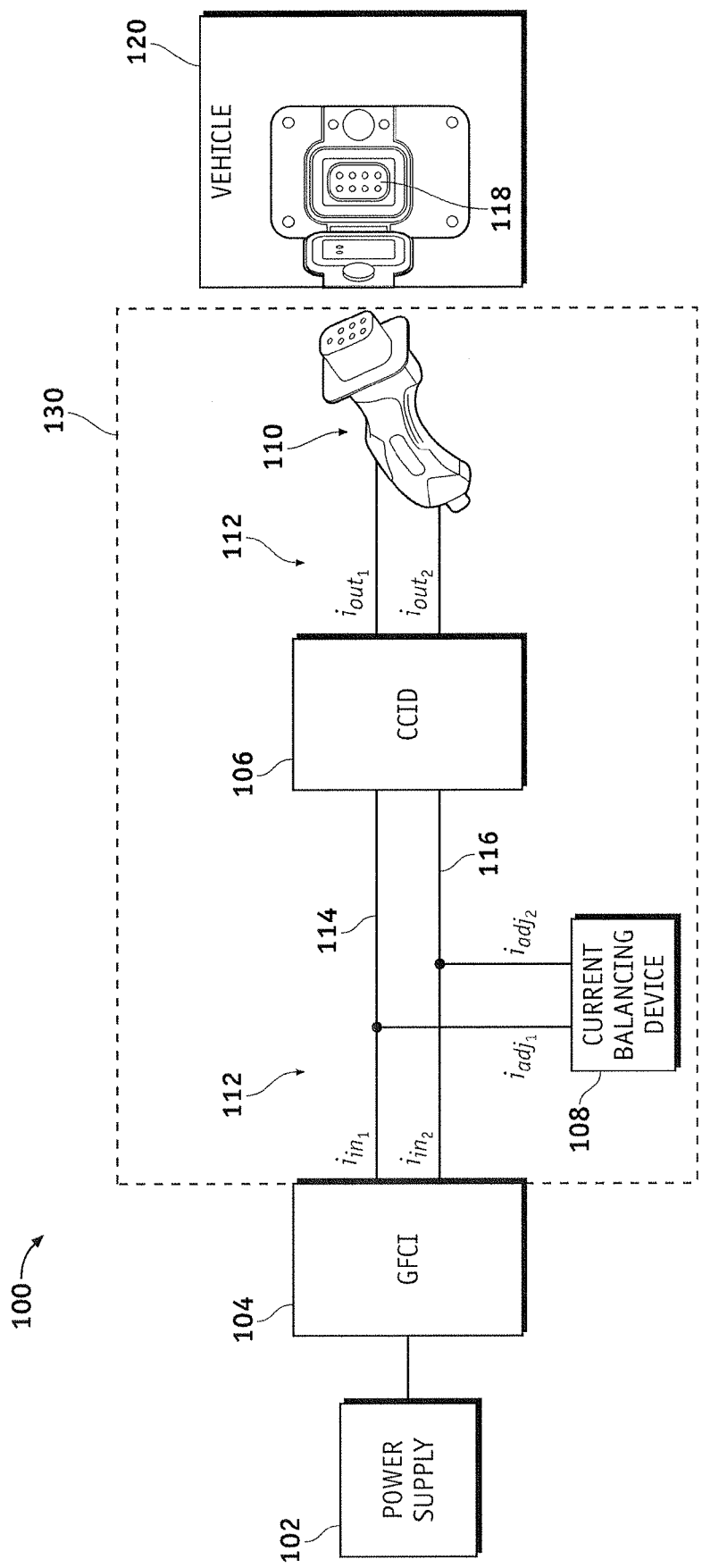
FIG. 1 is a block diagram of a charging system in accordance with one embodiment.

Referring now to FIG. 1, in an exemplary embodiment, a charging system 100 includes, without limitation, a power supply 102, an interrupt device 104, a charge current interrupt device (CCID) 106, a current balancing device 108, and a plug 110. The interrupt device 104, CCID 106, current balancing device 108, and plug 110 may be coupled together or otherwise interface via a cord 112 comprising a plurality of conductors 114, 116. In accordance with one embodiment, the CCID 106, current balancing device 108, plug 100, and cord 112 are integral with each other to form a cord set 130. In an exemplary embodiment, the plug 110 is adapted to interface, mate, or otherwise connect with a corresponding receptacle 118 to provide charging power from the power supply 102 to a vehicle 120, as will be understood.

In an exemplary embodiment, the power supply 102 is coupled to the interrupt device 104 and configured to provide current to one or more external devices via the interrupt device 104. Although the power supply 102 and interrupt device 104 are shown as separate elements, in practice, the interrupt device 104 may be integral with the power supply 102. The plug 110 may be coupled to the interrupt device 104 and configured to receive electrical power from the power supply 102 via the cord 112. Although not illustrated, the cord 112 may include an interface, such as a power plug, adapted to mate with a receptacle, such as a wall socket, to couple the cord 112 to the interrupt device 104 and power supply 102, as will be understood. In an exemplary embodiment, the CCID 106 is coupled between the interrupt device 104 and the plug 110. The current balancing device 108 is also coupled to the cord 112 between the interrupt device 104 and the CCID 106.

In accordance with one embodiment, the power supply 102 is realized as a main power supply or main electrical system for a building, residence, or another structure within an electric power grid (e.g., mains electricity or grid power). In accordance with one embodiment, the power supply 102 may comprise an alternating current (AC) single-phase power supply, as is common to most residential structures, which varies depending on the geographic region. For example, in the United States, the power supply 102 may be realized as 120 Volt or 240 Volt at 60 Hz, while in other regions the power supply 102 may be realized as 110 Volts at 50 Hz. In alternative embodiments, the power supply 102 may be realized as any electrical energy source suitable for providing charging power to an external device (e.g., vehicle 120).

In an exemplary embodiment, the power supply 102 is configured to provide electrical power and/or current via the interrupt device 104. The interrupt device 104 may be realized as a ground fault current interrupter (GFCI), alternatively referred to as a ground fault circuit interrupter, or another suitable current safety device. The interrupt device 104 is configured to disconnect an external circuit coupled to the power supply 102 via the interrupt device 104 when it detects a current imbalance that exceeds a given trip point (or sensitivity) for the interrupt device 104. As used herein, "trip point" should be understood as a specific current differential or imbalance between two conductors, wherein a given current interrupt device is configured to trip, decouple, or otherwise disconnect an electrical circuit from a power supply, at which point current is prevented from flowing to the electrical circuit. For most residential applications, the trip point for the interrupt device will generally be between 4-6 mA. In an exemplary embodiment, the interrupt device 104 includes detection circuitry having a frequency response (or operating frequency, time window or break time) for detecting a fault. For example, the interrupt device 104 may be a GFCI having a trip point of 5 mA within 25 milliseconds.

In an exemplary embodiment, the CCID 106 is realized as a current interrupt device having a trip point with a higher current level than the interrupt device 104. The CCID 106 is configured to disconnect the device being charged (e.g., vehicle 120) from the power supply 102 whenever it detects that the current differential that exceeds the trip point, as described in greater detail below. For example, a CCID 106 used for charging a vehicle 120 may have a trip setting of 20 mA current imbalance or greater. In accordance with one embodiment, the CCID 106 is integral with the cord 112. The cord 112 has an input end (e.g., includes an input power plug or is proximate a wall socket) and an output or device end (e.g., at plug 110), as will be understood in the art. In accordance with one embodiment, the CCID 106 is located within one foot of the input end of the cord 112. The cord 112 comprises a plurality of conductors 114, 116, which may be realized as wire, cable, or another conductive material suitable for power transmission. In an exemplary embodiment, a current differential between the conductors 114, 116 is substantially equal to zero (within some small tolerance) absent a fault or leakage of current to another device or component.

Referring now to FIG. 1, in an exemplary embodiment, the current balancing device 108 is coupled between the CCID 106 and the interrupt device 104 and configured to balance the current through the conductors 114, 116 at the input end of the cord 112 (e.g., input current $i_{in_1}$ and $i_{in_2}$) such that the CCID 106 trips before the interrupt device 104 in the event of a fault or another failure mode in a device coupled to the output end of the cord 112 (e.g., vehicle 120). The current balancing device 108 adjusts the current through the conductors 114, 116 to keep the current differential at the interrupt device 104 less than a threshold value, as described in greater detail below. In accordance with one embodiment, the current balancing device 108 is integral with or incorporated in the CCID 106 (see FIG. 2). The current balancing device 108 may be realized by any number of hardware, software, and/or firmware components configured to perform the functions described herein.

Figure 2:
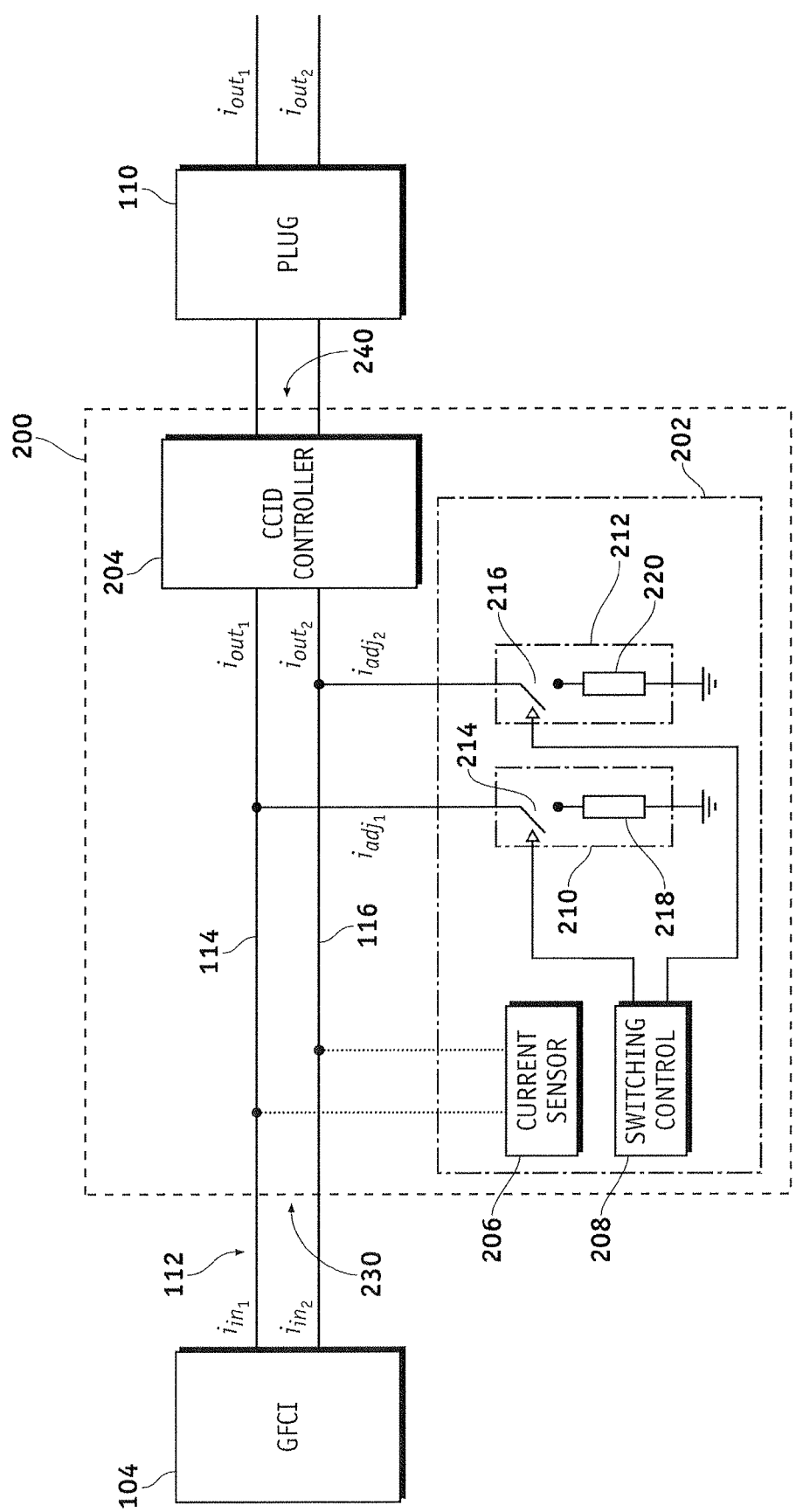
FIG. 2 is a block diagram of an exemplary charge current interrupt device suitable for use in the charging system of FIG. 1 in accordance with one embodiment.

Referring now to FIG. 2, in an exemplary embodiment, a charge current interrupt device 200 (e.g., CCID 106) includes, without limitation, a current balancing device 202 (e.g., current balancing device 108) and a CCID controller 204. The current balancing device 202 may further include, without limitation, a current sensor 206, a switching control 208, a first switched load 210, and a second switched load 212. In an exemplary embodiment, the current balancing device 108 is configured to adjust the current through the conductors 114, 116 (or cord 112) to keep the input current differential less than a threshold value (e.g., $|i_{in_1}-i_{in_2}|<i_{TH_1}$), such that the CCID controller 204 may trip and prevent current flow in the event of a fault on the output or device side of the CCID 200, as described in greater detail below.

In an exemplary embodiment, the current sensor 206 is adapted to be coupled to the first conductor 114 and the second conductor 116 between the input 230 of the CCID 200 and the CCID controller 204. The first switched load 210 is adapted to be coupled between the first conductor 114 and a reference potential (e.g., an electrical ground), and the second switched load 212 is adapted to be coupled between the second conductor 116 and a reference potential. The switching control 208 is coupled to the current sensor 206, the first switched load 210, and the second switched load 212. In an exemplary embodiment, the switching control is configured to selectively connect the load elements 218, 220 of the switched loads 210, 212 to the conductors 114, 116 as described in greater detail below. In other words, the switching control activates (closes) the switches to couple (or insert) the respective load elements between the conductors and the reference potential, and deactivates (opens) the switches to disconnect the respective load elements from the conductors.

The CCID controller 204 is adapted to be coupled to the conductors 114, 116 between the current balancing device 108 and the output 240 of the CCID 200. In an exemplary embodiment, the CCID controller 204 is configured to prevent current flow through the conductors 114, 116 at the output 240 if the current imbalance (or differential) is greater than a threshold value or trip point for the CCID 200. For example, the CCID controller 204 may prevent current flow at the output 240 if the difference between the current through the CCID controller 204 is greater than or equal to 20 mA ($|i_{out_1}-i_{out_2}|\geq 20$ mA). Depending on the embodiment, the CCID controller 204 may be realized by any number of hardware, software, and/or firmware components configured to perform the specified functions. For example, the CCID controller 204 may include contactors (or another suitable switching mechanism) under the control of a microcontroller, processor, or integrated circuit configured to control operation (e.g., opening and/or closing) of the contactors. It should be appreciated that CCID controller 204 is one exemplary means for preventing current flow through the output 240. In alternative embodiments, in addition to or in place of CCID controller 204, other suitable means for preventing current flow through the CCID 200 may be used, as will be appreciated in the art.

In an exemplary embodiment, the current sensor 206 is configured to obtain or measure the current through the conductors 114, 116 at or near the input 230 of the CCID 200. Conventional methods and/or means for obtaining or measuring current are well known, and so, in the interest of brevity, will only be mentioned briefly herein or omitted entirely without providing the well known details. Depending on the embodiment, the current sensor 206 may be inline or integral with the conductors 114, 116 or separate from the conductors 114, 116 as shown. The current sensor 206 may be realized as any number of hardware, software, and/or firmware components configured to obtain and/or measure the current through the conductors 114, 116. For example, the current sensor 206 may be realized in hardware using one or more sense resistors and comparator circuitry or other logic to obtain and/or measure the current. In accordance with one embodiment, the current sensor 206 and/or current balancing device 108 operates at a higher frequency than the detection circuitry of the interrupt device 104. In such an embodiment, the current sensor 206 may be realized as an application-specific integrated circuit (ASIC) or digital signal processor (DSP). In alternative embodiments, other suitable means for measuring current through the conductors 114, 116 may be used, as will be appreciated in the art.

In an exemplary embodiment, the load elements 218, 220 of the switched loads 210, 212 are each adapted to be selectively coupled and/or decoupled between the respective conductors 114, 116 and a reference potential as described below. In this regard, the switched loads 210, 212 may be realized as a switching element 214, 216 and a load element 218, 220 configured electrically in series between the respective conductor 114, 116 and an electrical ground. The switching element 214, 216 may be realized as a semiconductor device, switch, a contactor, a rectifier (e.g., a silicon-controller or semiconductor-controlled rectifier or SCR) or other combinations of circuitry and/or logic elements capable of enabling the load element 218, 220 to be selectively coupled other circuit components. The load element 218, 220 may be realized as a resistor, a variable resistor, an inductor, a semiconductor device, and/or various combinations thereof. In the configuration where the switched loads 210, 212 are coupled to the electrical ground, as viewed from the interrupt device 104 and/or input 230, the switched loads 210, 212 are effectively in parallel electrically with any devices (e.g., vehicle 120) coupled to the conductors 114, 116 (e.g., via plug 110 or output 240). Accordingly, when the load element 218, 220 of a switched load 210, 212 is connected to the respective conductor 114, 116 (e.g., switching element 214, 216 is closed or otherwise activated to allow current flow), the switched load 210, 212 reduces the effective input resistance (or impedance) as seen from the interrupt device 104 (or input 230) by virtue of the parallel configuration. This causes the current through the respective conductor 114, 116 at the input 230 (e.g., interrupt device 104) to increase when the load element 218, 220 of the switched load 210, 212 is coupled, as described in greater detail below. It should be appreciated that switching element 214, 216 and load element 218, 220, are exemplary means for increasing current through a conductor 114, 116. In alternative embodiments, in addition to or in place of switching element 214, 216 and load element 218, 220, other suitable means for increasing current through the conductors 114, 116 may be used, as will be appreciated in the art.

In an exemplary embodiment, the switching control 208 is configured to enable the load element 218, 220 of a switched load 210, 212 to be selectively coupled to a conductor 114, 116 if the current imbalance (or differential or leakage) at the input 230 is greater than a first threshold value. In an exemplary embodiment, the first threshold value is less than the trip point of the interrupt device 104. In accordance with one embodiment, the switching control 208 may interface directly with, control, or otherwise activate the switching element 214, 216. The switching control 208 may also be configured to decouple the load element 218, 220 of the switched load 210, 212 if the current imbalance is less than a second threshold value. Depending on the embodiment, the switching control 208 may be realized by any number of hardware, software, and/or firmware components configured to perform the specified functions described herein. For example, an embodiment of the switching control 208 may employ various integrated circuit components, e.g., memory elements, digital signal processing elements, logic elements, look-up tables, or the like, which may carry out a variety of functions under the control of one or more microprocessors or other control devices. In an exemplary embodiment, the switching control 208 operates at a higher frequency than the interrupt device 104.

Figure 3:
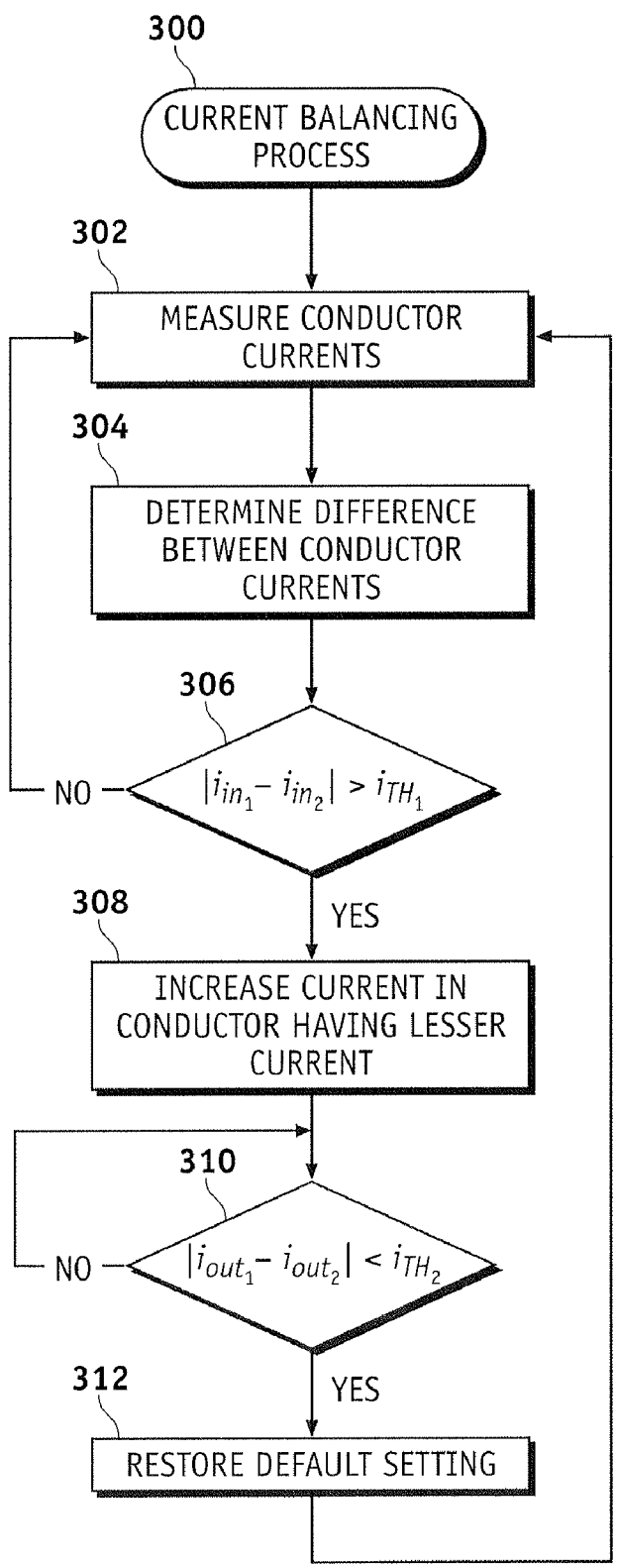
FIG. 3 is a flow diagram of an exemplary current balancing process suitable for use with the charge current interrupt device of FIG. 2 or the charging system of FIG. 1 in accordance with one embodiment.

Referring now to FIG. 3, in an exemplary embodiment, a current balancing device 108, 202 may be configured to perform a current balancing process 300 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the current balancing device 108, 202, the current sensor 206, or the switching control 208. It should be appreciated that current balancing process 300 may include any number of additional or alternative tasks, the tasks shown in FIG. 3 need not be performed in the illustrated order, and current balancing process 300 may be incorporated into a more comprehensive procedure or process having additional functionality not described in detail herein.

Referring now to FIG. 3, and with continued reference to FIG. 1 and FIG. 2, the current balancing process 300 may be initiated or initialized in response to coupling the cord or conductors to a power supply. For example, although not shown in FIG. 1 or FIG. 2, the cord 112 may include an interface (e.g., power plug) that mates with a receptacle (e.g., a power socket/outlet or wall socket/outlet) associated with the power supply 102 and/or interrupt device 104. In accordance with one embodiment, the current balancing process 300 initializes to a default setting wherein current balancing device 108 is configured such that neither switched load 210, 212 is coupled to the respective conductor 114, 116. In this default configuration, no current flows through the switched loads ($i_{adj_1}$=0 and $i_{adj_2}$=0), and the current through the conductors 114, 116 at the interrupt device 104 is substantially equal to the current at the output of the CCID 106, 200 (e.g., $i_{in_1}$=$i_{out_1}$ and $i_{in_2}$=$i_{out_2}$).

In an exemplary embodiment, the current balancing process 300 is configured to obtain or measure the input current through the conductors (task 302). For example, the current sensor 206 may obtain or measure the input current through the conductors 114, 116 at or near the input 230 of CCID 200 ($i_{in_1}$ and $i_{in_2}$). The current balancing process 300 is configured to determine the difference between the measured conductor currents (task 304). For example, the current sensor 206 and/or switching control 208 may be configured to determine the difference between $i_{in_1}$ and $i_{in_2}$. Although not illustrated in FIG. 3, in accordance with one embodiment, the current balancing process 300 is disabled or otherwise configured to stop, exit or end if the current differential between $i_{in_1}$ and $i_{in_2}$ exceeds the trip point of the CCID 106, 200. This will allow an interrupt device 104 coupled to the CCID 106, 200 to trip or otherwise prevent current flow in the event there is a problem with the CCID 106, 200.

In an exemplary embodiment, the current balancing process 300 is configured to determine if the input current differential is greater than a first threshold value ($|i_{in_1}-i_{in_2}|>i_{TH_1}$) (task 306). For example, the switching control 208 may be configured to determine if the current through one conductor 114, $i_{in_1}$, is greater than current through the other conductor 116, $i_{in_2}$, by more than the first threshold value. In an exemplary embodiment, the first threshold value ($i_{TH_1}$) is greater than zero and less than the trip point of the interrupt device 104 coupled to the conductors 114, 116. For example, if the current balancing process 300 is configured for use with a residential interrupt device 104 the first threshold value will generally be less than 5 mA. In accordance with one embodiment, the first threshold value is 1 mA.

If the current through one conductor is greater than current through another conductor by more than the first threshold value, the current balancing process 300 is configured to increase the current through the conductor having the lesser current (task 308). For example, if the input current through the first conductor 114 ($i_{in_1}$) is greater than the input current through the second conductor 116 ($i_{in_2}$), the switching control 208 may be configured to determine or identify the second conductor 116 as having the lesser current. In accordance with one embodiment, the switching control 208 may be configured to selectively couple the switched load 212 coupled to the second conductor 116, to increase the input current in the conductor 116 by a balancing current $i_{adj_2}$. Similarly, if the current through the second conductor 116 ($i_{in_2}$) is greater than the current through the first conductor 114 ($i_{in_1}$), the switching control 208 may be configured to determine or identify the first conductor 114 as having the lesser current. The switching control 208 may be configured to selectively couple switched load 210 to increase the current in the first conductor 114 by a balancing current, $i_{adj_1}$. In accordance with one embodiment, the switching control 208 and/or switched load 210, 212 may be configured such that the magnitude of the balancing current ($i_{adj_1}$ and $i_{adj_2}$) varies as desired during the current balancing process 300. It should be noted that while this reduces or eliminates the current differential at the interrupt device 104, the current differential remains at the output of the CCID 106, 200 (e.g., $i_{out_1}$ and $i_{out_2}$), thereby allowing the CCID 106, 200 to trip or otherwise prevent current flow when a higher current differential is reached at the output without the interrupt device 104 tripping first at a lower current differential.

In an exemplary embodiment, the current balancing process 300 is configured to compare the difference between the output current flowing through the CCID to a second threshold value (task 310). For example, the switching control 208 may be configured to calculate the current at the output 240 (e.g., $i_{out_1}$ and $i_{out_2}$) based on the current at the input 230 (e.g., $i_{in_1}$ and $i_{in_2}$) and the characteristics of the switched load 210, 212 and/or the balancing current (e.g., $i_{adj_1}$ and $i_{adj_2}$). In alternative embodiments, the current sensor 206 may be adapted to be coupled to or otherwise measure the current at the output of the CCID 106, 200. Although not illustrated in FIG. 3, in accordance with one embodiment, the current balancing process 300 is disabled or otherwise configured to stop, exit or end if the output current differential exceeds the trip point of the CCID 106, 200. This will allow an interrupt device 104 coupled to the CCID 106, 200 to trip or otherwise prevent current flow at the output of the CCID 106, 200 in the event there is a problem with the CCID 106, 200.

In an exemplary embodiment, if the difference between the output current is less than the second threshold value (e.g., $|i_{out_1}-i_{out_2}|<i_{TH_2}$) the current balancing process 300 is configured to restore the initial default setting (task 312). For example, the current balancing device 202 is returned to the configuration wherein neither switched load 210, 212 is coupled to a conductor 114, 116. In this regard, the switching control 208 may be configured to decouple the switched loads 210, 212 from the respective conductors 114, 116. In an exemplary embodiment, the second threshold value ($i_{TH_2}$) is less than the first threshold value ($i_{TH_1}$) and may be chosen as a current differential indicative of relatively normal operation. For example, if the first threshold value is selected as 1 mA, then the second threshold value may be between zero and 1 mA. It will be appreciated that while the current balancing device 108 is balancing current at the interrupt device 104, the balancing current (e.g., $i_{adj_1}$ and $i_{adj_2}$) may generate heat and/or consume electrical power that is not performing an otherwise useful function, and thus, it is desirable to restore the default setting as appropriate. The loop defined by tasks 302, 304, 306, 308, 310, and 312 may repeat as desired to enable continuous current balancing.

One advantage of the systems and methods described above is that the current on the input side of the CCID is balanced to allow the CCID to trip before another interrupt device, such as a GFCI, which may have a lower trip point than the CCID. This avoids undesirable nuisance trips, which may occur during otherwise normal operating conditions and cause a GFCI to trip, while at the same time maintaining the safety protections of the GFCI.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A charge current interrupt device comprising:
   a current sensor adapted to be coupled to a first conductor and a second conductor, the current sensor being configured to obtain a first current through the first conductor and a second current through the second conductor;
   a first switched load coupled between the first conductor and a reference potential, the first switched load comprising a first load element; and
   a switching control coupled to the current sensor and the first switched load, the switching control being configured to activate the first switched load if the second current is greater than the first current by more than a threshold value, wherein the first load element is coupled between the first conductor and the reference potential when the first switched load is activated.

2. The charge current interrupt device of claim 1, further comprising a second switched load coupled to the switching control, the second switched load being coupled between the second conductor and the reference potential and the second switched load comprising a second load element, wherein the switching control is configured to activate the second switched load if the first current is greater than the second current by more than the threshold value, the second load element being coupled between the second conductor and the reference potential when the second switched load is activated.

3. The charge current interrupt device of claim 1, further comprising a controller adapted to be coupled to the first conductor and the second conductor, wherein the controller is configured to prevent current from flowing through the charge current interrupt device if a difference between the first current and the second current is greater than a second threshold value.

4. The charge current interrupt device of claim 1, wherein the switching control is configured to deactivate the first switched load, such that the first load element is disconnected from the first conductor, if the second current is greater than the first current by more than a second threshold value.

5. The charge current interrupt device of claim 1, wherein the first load element is selected from a group consisting of a resistor, a variable resistor, an inductor, and a semiconductor device.

6. The charge current interrupt device of claim 1, wherein the first conductor and the second conductor are adapted to be coupled to a ground fault current interrupt device, the ground fault current interrupt device being configured to prevent current flow to the first conductor and the second conductor if a difference between the first current and the second current is greater than a trip point.

7. The charge current interrupt device of claim 6, wherein the threshold value is between 0 mA and the trip point.

8. The charge current interrupt device of claim 1, wherein the switching control is configured to deactivate the first switched load after activating the first switched load if a difference between the first current and the second current is less than a second threshold value, wherein the first load element is disconnected from the first conductor when the first switched load is deactivated.

9. The charge current interrupt device of claim 1, wherein the first switched load includes a switching element coupled electrically in series between the first conductor and the first load element, wherein the switching control is configured to activate the first switched load by closing the switching element.

10. The charge current interrupt device of claim 1, wherein the first load element is configured to increase the first current when the first switched load is activated.

11. The charge current interrupt device of claim 1, wherein activating the first switched load results in a balancing current through the first load element that reduces a current differential between the first current and the second current.

12. A method for balancing current through a first conductor and a second conductor, the first conductor and the second conductor being coupled to a ground fault current interrupt device, the method comprising:
   determining if a first current through the first conductor is greater than a second current through the second conductor by more than a threshold value, the first current and the second current being received from the ground fault current interrupt device; and
   increasing the second current in response to determining that the first current is greater than the second current by more than the threshold value.

13. The method of claim 12, further comprising measuring the first current and the second current.

14. The method of claim 12, wherein increasing the second current further comprises coupling a switched load between the second conductor and a reference potential.

15. The method of claim 14, further comprising decoupling the switched load from the second conductor if an output current differential is less than a second threshold value.

16. The method of claim 12, further comprising:
   determining if the second current is greater than the first current by more than the threshold value; and
   increasing the first current in response to determining that the second current is greater than the first current by more than the threshold value.

17. The method of claim 16, wherein increasing the first current further comprises coupling a second switched load between the first conductor and a reference potential.

18. The method of claim 17, further comprising decoupling the second switched load if a difference between the first current and the second current is less than a second threshold value.

19. A charge current interrupt device, the charge current interrupt device comprising:

means for measuring current through a plurality of conductors coupled to the charge current interrupt device; and means for increasing a first current through a first conductor of the plurality of conductors if the first current is less than a second current though a second conductor of the plurality of conductors by more than a threshold value.

20. The charge current interrupt device of claim 19, further comprising means for preventing current flow from the charge current interrupt device if a difference between the first current and the second current is greater than a trip point.

\* \* \* \* \*